United States Patent [19]

Ikemori

[11] 4,232,942
[45] Nov. 11, 1980

[54] OPTICALLY COMPENSATED ZOOM LENS

[75] Inventor: Keiji Ikemori, Yokohama, Japan

[73] Assignee: Canon Kabushiki Kaisha, Tokyo, Japan

[21] Appl. No.: 906,630

[22] Filed: May 16, 1978

[30] Foreign Application Priority Data

May 18, 1977 [JP] Japan .................................. 52-57451

[51] Int. Cl.³ .............................................. G02B 15/14
[52] U.S. Cl. ................................................ 350/184
[58] Field of Search ............................. 350/184, 186

[56] References Cited

U.S. PATENT DOCUMENTS

| | | | |
|---|---|---|---|
| 2,843,016 | 7/1958 | Reiss .................................. | 350/184 |
| 2,925,010 | 2/1960 | Turula et al. ..................... | 350/184 |

FOREIGN PATENT DOCUMENTS

| | | | |
|---|---|---|---|
| 1120271 | 4/1956 | France ................................. | 350/184 |
| 44-14877 | 7/1969 | Japan .................................. | 350/184 |
| 1028353 | 5/1966 | United Kingdom ................ | 350/184 |

*Primary Examiner*—Paul A. Sacher
*Attorney, Agent, or Firm*—Toren, McGeady and Stanger

[57] ABSTRACT

An optically compensated zoom lens particularly suited for use in a still camera. This lens system comprises positive first, negative second and positive third lens groups counting from the front of which the first and third ones are axially movable in fixedly spaced relation to each other during zooming, while the second one remains stationary together with a relay lens group that follows the third lens group, the relay lens group consisting of a negative lens with its front surface of strong divergence, and bi-convex, bi-concave and bi-convex lenses. In said first and said second lens groups, there are provided individual divergent contact surfaces configured in opposite direction of curvature to each other so as to facilitate good correction of astigmatism and distortion. For high grade imaging performance throughout the entire range of magnification, the shift of focal plane with zooming is limited within the depth of focus by fulfilling the following relationships for the three lens groups in the zoom portion:

(1) $0.97\ Ft < f1 < 1.23\ Ft$
(2) $0.31\ Ft < |f2| < 0.42\ Ft$
(3) $0.38\ Ft < f3 < 0.51\ Ft$
(4) $12 < (S/M) < 17$ wherein
 f1: the focal length of the first lens group;
 f2: the focal length of the second lens group;
 f3: the focal length of the third lens group;
 S: the length of movement of the first and third lens groups from the wide angle setting to the telephoto setting;
 M: the magnification ratio; and
 Ft: the focal length of the entire system when in the telephoto setting.

11 Claims, 8 Drawing Figures

OPTICALLY COMPENSATED ZOOM LENS

BACKGROUND OF THE INVENTION

This invention relates to an optically-compensated zoom lens with a zoom portion comprised of a positive first, a negative second and a positive third lens group of which the first and third are movable along a common optical axis in fixedly spaced relation to each other, while the second lens group remains stationary during zooming.

The zoom lenses are generally classified into two categories by the shift of focal plane compensation technique, i.e., mechanically-compensated zoom lens and optically-compensated zoom lens. Of these the latter gives rise to a difficult problem when designed to be used as a zoom lens for a still camera. This problem is solved by decreasing the length of translation of the movable portion, i.e. the first lens group and the third lens group in such a manner that, while the relative aperture is maintained at a somewhat large level, high grade imagery is preserved throughout the zooming range by limiting the image shift within the depth of focus.

A practical example of the optically-compensated zoom lens adapted for use in a still camera is disclosed in Japanese Patent Application No. Sho 49-23911, as comprising four lens groups of which the first, third and fourth are of positive power, and of which the second is of negative power. And the second and fourth lens groups are maintained stationary during zooming, and the first and third lens groups are movable for zooming in fixedly spaced relation to each other on the opposite side of the second lens group. And each of the first and third lens groups is provided with a divergent contact surface of the positive sign. In the zoom system, each lens group of the zoom portion generally needs to be separately achromatized for good correction of the aberrations, and for that purpose, each lens group needs to be provided with a contact surface, with the arrangement of the positive, negative and positive lens groups in the zooming portion of the optically-compensated zoom lens, however, when the divergent contact surfaces in the first and third lens groups are both positive in curvature, the distortion tends to be increased in pincushion sense at the telephoto side, when they are both negative, over-correction of astigmatism will result.

Another problem which arises when zooming is to restrict a shift of focal plane to a fraction of the depth of focus. In the case of the aforesaid type optically-compensated zoom lens, the magnitude of shift of the back focus, that is, the image plane varies with zooming, following a cubic curve of the movement of the movable portion. Letting S denotes the amount of movement of the movable portion measured from the telephoto position to the wide angle position, the magnitude of the shift of focal plane becomes maximum at two points of zooming which are generally near $\frac{1}{4}S$ and $\frac{3}{4}S$. On the other hand, if the best focus for an objective lens in a 35 m/m still camera is assumed to be determined by the circle of least confusion at 0.033 mm, the depth of focus is expressed as 0.033×F-number. Hence, for good image quality, the difference between the back focus when in the telephoto setting and any of those when in the wide angle setting and intermediate settings for $\frac{1}{4}S$ and $\frac{3}{4}S$ must be smaller than the depth of focus expressed as 0.033×F-number.

As the size of aperture opening is increased, the depth of focus is decreased. Further an increase in the zoom ratio without involving any great increase the bulk and size of the complete objective, in other words, the length of translation of the movable portion calls for an increase in the refractive powers of the each lens group in the zooming portion, which will result in the tendency of increasing the image shift. Accordingly, in designing an optically-compensated zoom lens objective, it has been difficult to achieve simultaneous minimization of the bulk and size of the complete objective and the image shift for high grade imaging performance throughout the entire zooming range.

SUMMARY OF THE INVENTION

An object of the present invention is to provide an optically-compensated zoom lens having a high relative aperture with an increased range of magnification change over which the shift of focal plane from the reference position taken at the telephoto setting falls almost within the depth of focus.

Another object is to provide an optically compensated zoom lens which is well corrected for the various aberrations and particularly distortion in the telephoto positions.

An example of a specific optically-compensated zoom lens according to the present invention has a shortest focal length longer than the standard one with the relative aperture ranging from 3.5 to 5.6 in F-number throughout which high grade imaging performance is preserved. One of the features of the invention is to enable the use of commonly available optical glass in making up all the lens elements of the zoom lens, and therefore to produce inexpensive zoom lenses.

DESCRIPTION OF THE PREFERRED EMBODIMENTS

Figure 1:
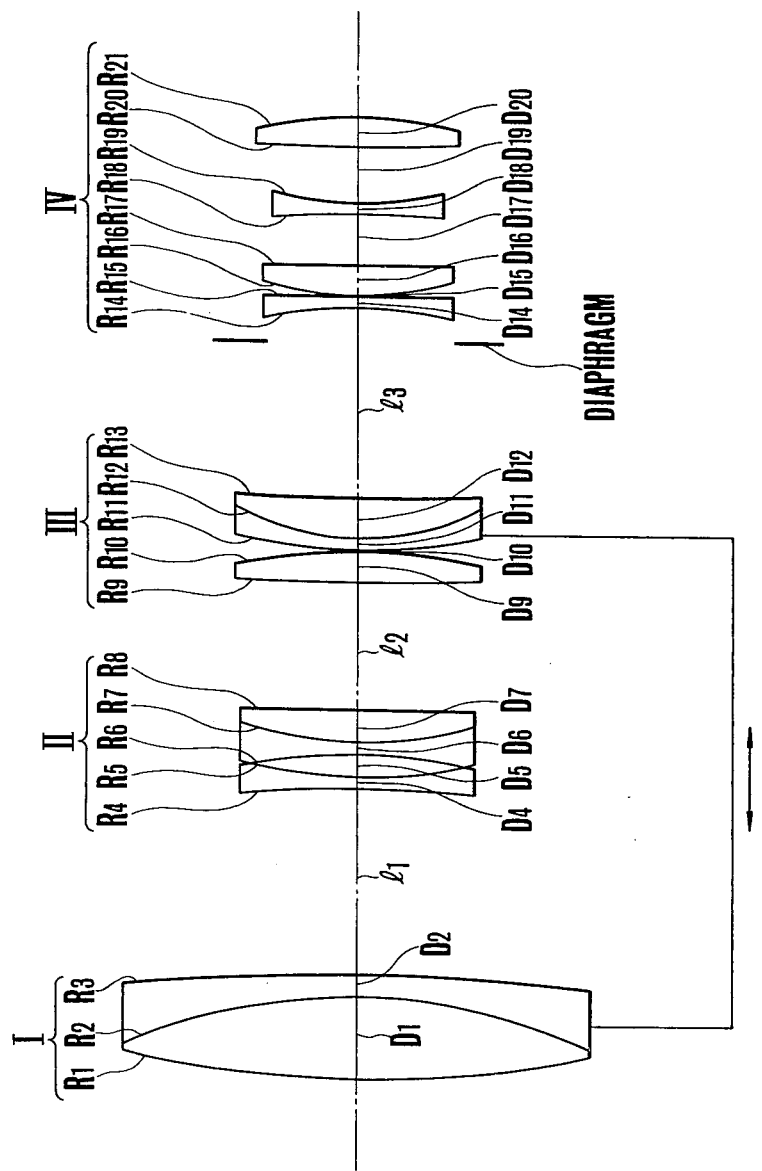
FIG. 1 is a block diagram of a first embodiment of an optically-compensated zoom lens according to the present invention.
Figure 2:
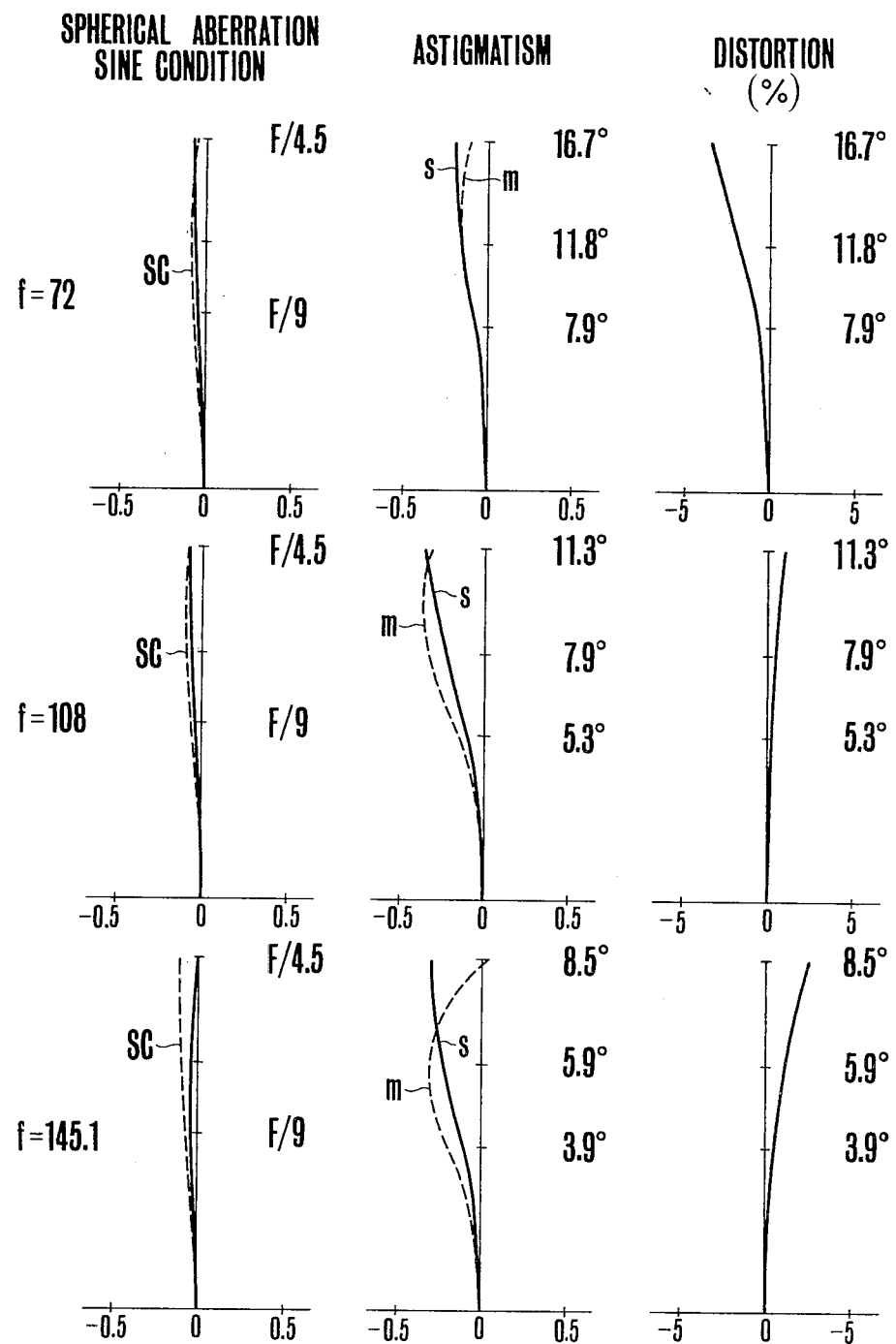
FIG. 2 is graphic representations of the spherical aberration with sine condition, astigmatism and distortion of the lens of FIG. 1 when in the wide angle, middle and telephoto settings with object at infinity.
Figure 3:
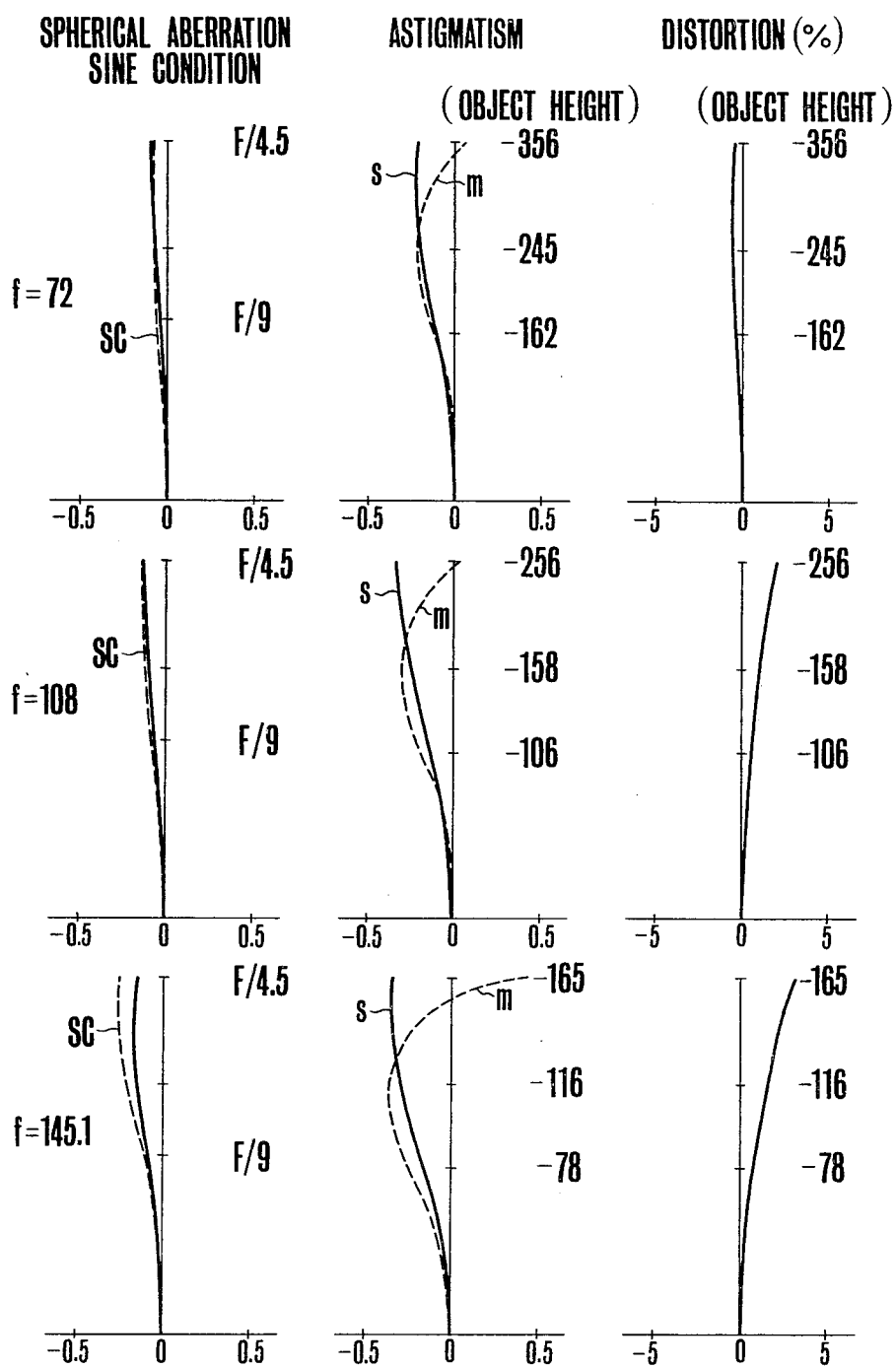
FIG. 3 is a similar representations with object at a distance of 1.5 meters.

Referring to FIG. 1, there is shown one embodiment of an optically-compensated zoom lens objective comprising four lens groups I, II, III and IV aligned on a common optical axis. The front or first lens group I consists of a bi-convex doublet with an internal contact surface R2 acting in a diverging manner. The second lens group II consists of a bi-concave singlet and a negative doublet with an internal contact surface R7 convex toward the front to act in a converging manner. The third lens group III consists of a positive singlet and a positive doublet with an internal contact surface R12 acting in a diverging manner. The fourth or relay lens group IV consists of a negative lens having a front surface R14 of strong divergence, a bi-convex lens, a bi-concave lens and a bi-convex lens. The internal contact surfaces R2 and R12 in the lens groups I and III have radii of curvature of the opposite sign to each other, in this instance, negative and positive, or concave and convex toward the front respectively, while in FIG. 4 and FIG. 7 embodiments the directions of curvature of the surfaces R2 and R12 are changed to be convex and concave respectively, thereby it being made possible to give a high standard of stabilization of the distortion and astigmatism throughout the zooming range.

To effect a change in magnification of the object, the first and third lens groups I and III are moved axially in fixedly spaced relation to each other but in differential relation to the second and fourth lens groups II and IV which remain stationary during the zooming. The axial movement of the first and third lens groups I and III causes simultaneous occurrence of the variation in the focal length of the system and the shift of a sharp image plane from the position which is usually taken at the telephoto setting. It has been found that the shift of image plane for the acceptable level of imagery may amount up to 15% larger than the depth of focus. As stated above, assuming that the circle of least confusion for the still camera objective is set forth as 0.033 mm, the depth of focus is determined to be ±0.033 times F-number. Therefore, the maximum allowable amount of image shift is roughly estimated to be 0.038 times F-number. The reason why the reference plane for the measurement of the shift of image plane is taken at the telephoto setting is that when the various elements of the zoom lens are assembled within the specific tolerances, the later fine adjustment becomes very easy.

According to the optically-compensated zoom lens of the present invention, when the refractive power of the lens groups of the zoom portion (from the first to the third lens groups) is increased, the same magnification is obtained by less movement of the movable portion, and on the contrary, when the refractive power is weakened, more movement for the movable portion is required for the same magnification. In the former, the movement amount of the image plane at the focal distance is large, F-number is increased so as to put the amount within the focal depth. On the contrary, in the latter case, the movement amount of the image plane is small, so that it is possible to reduce F-number and to increase the aperture.

Figure 4:
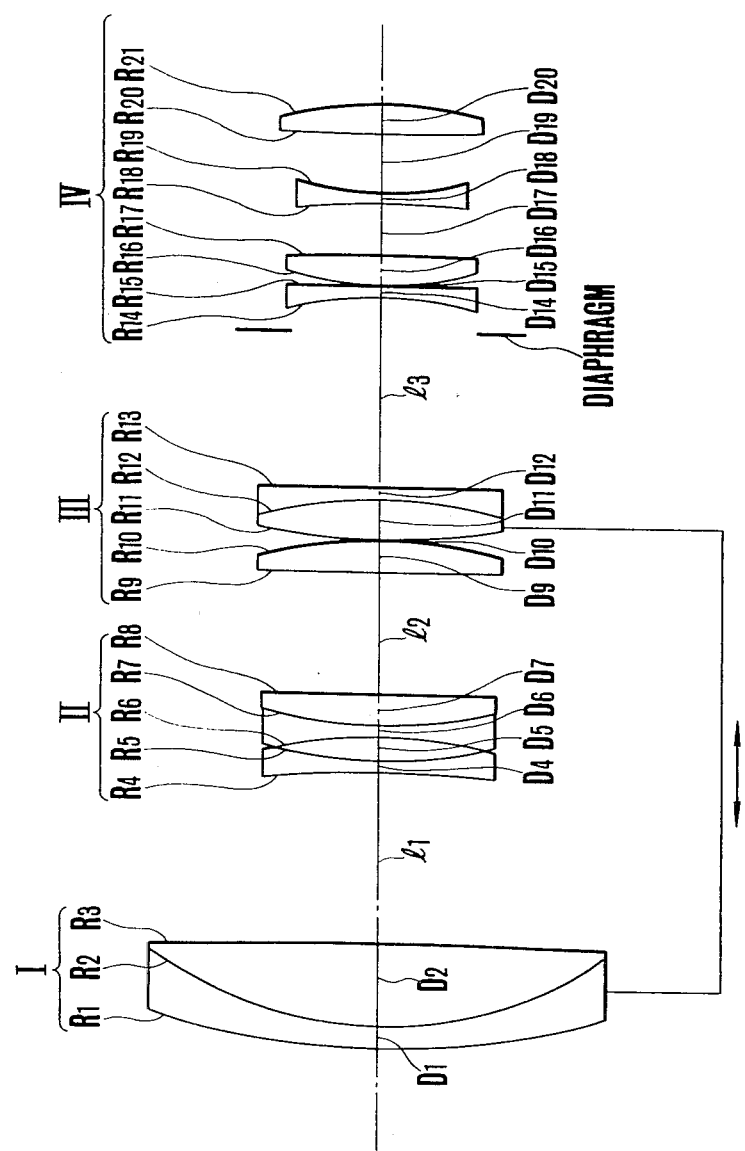
FIG. 4 is a lens block diagram of a second embodiment of the present invention.
Figure 5:
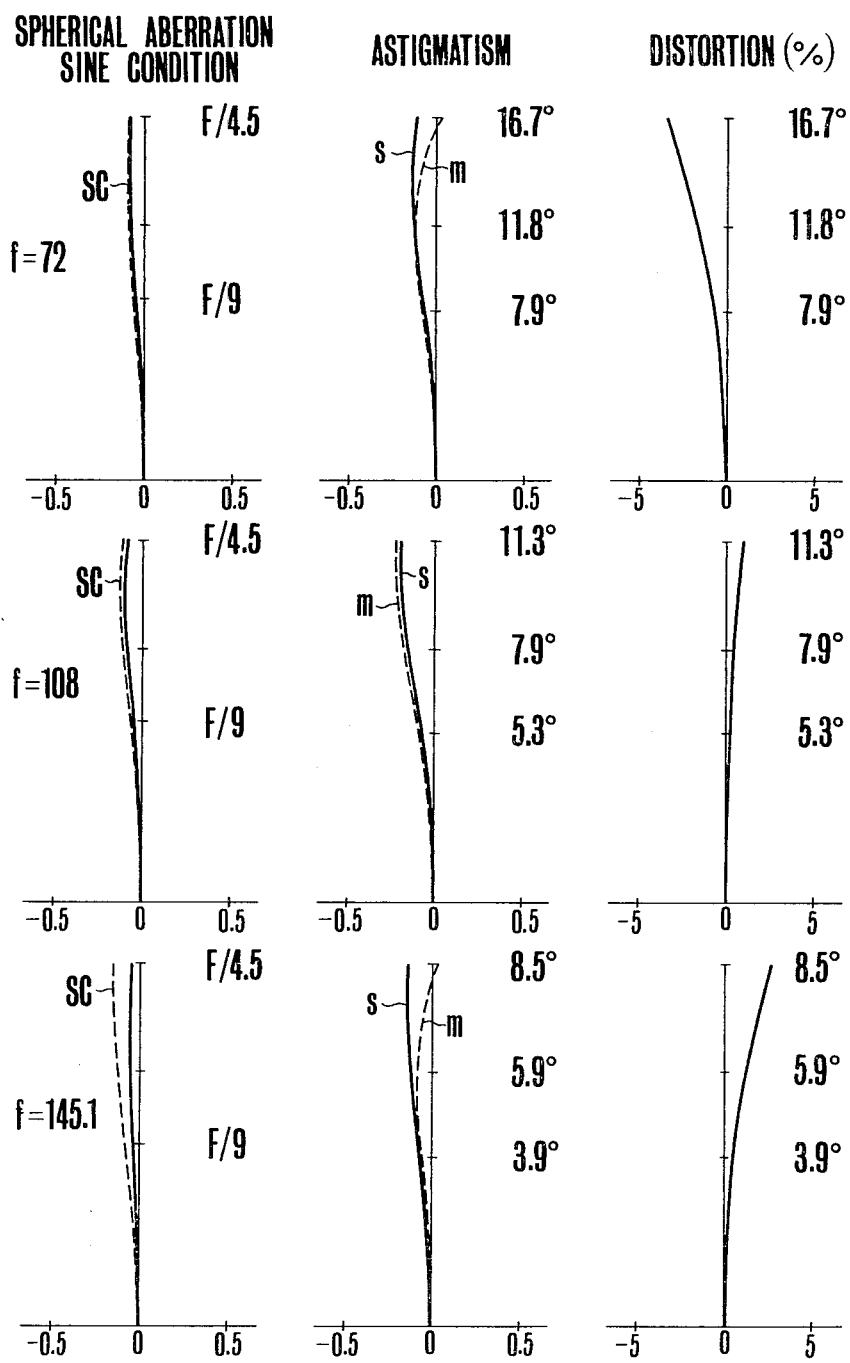
FIG. 5 is graphic representations of the aberrations of the lens of FIG. 4 with object at infinity.
Figure 6:
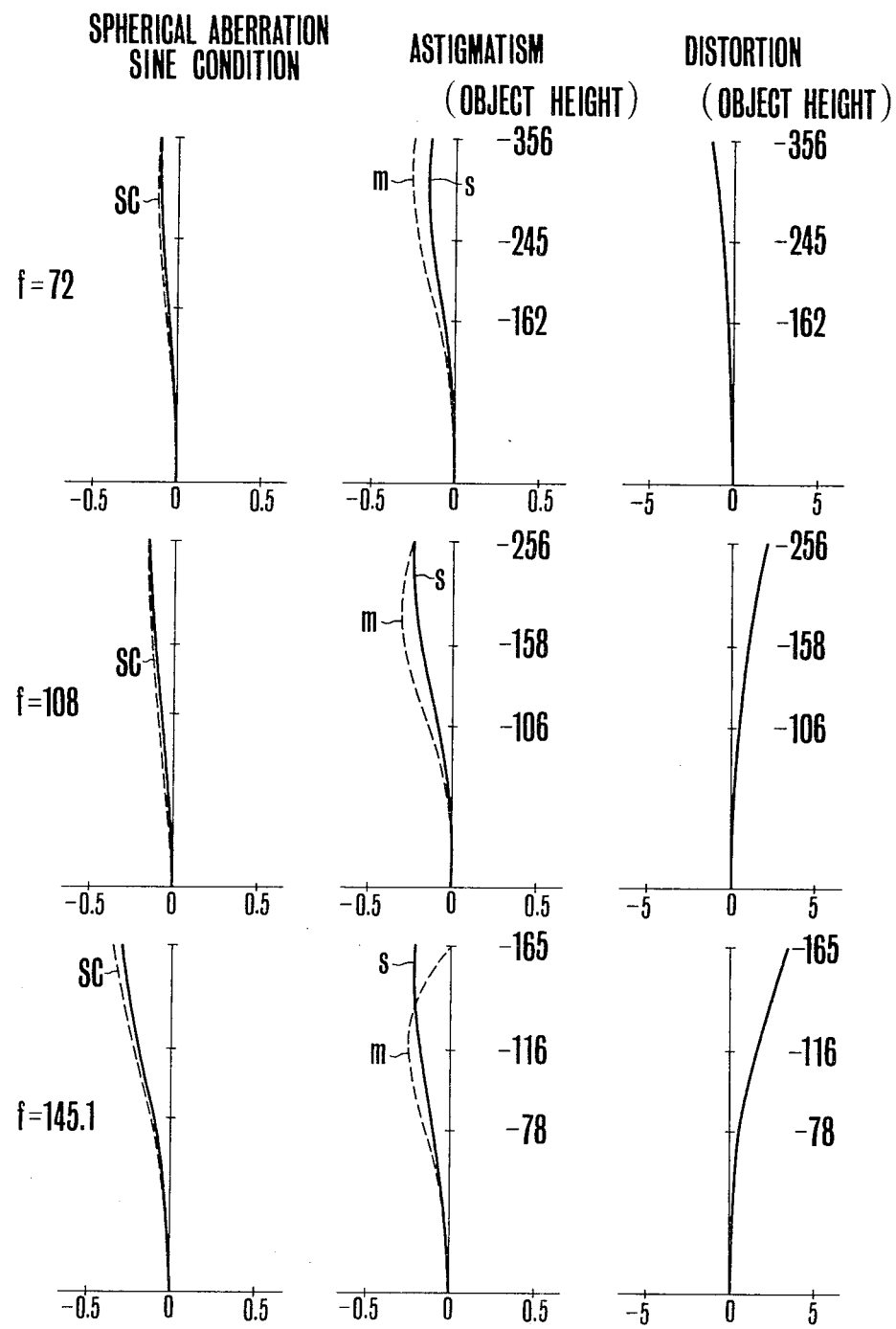
FIG. 6 is similar representations with object at a distance of 1.5 meters.
Figure 7:
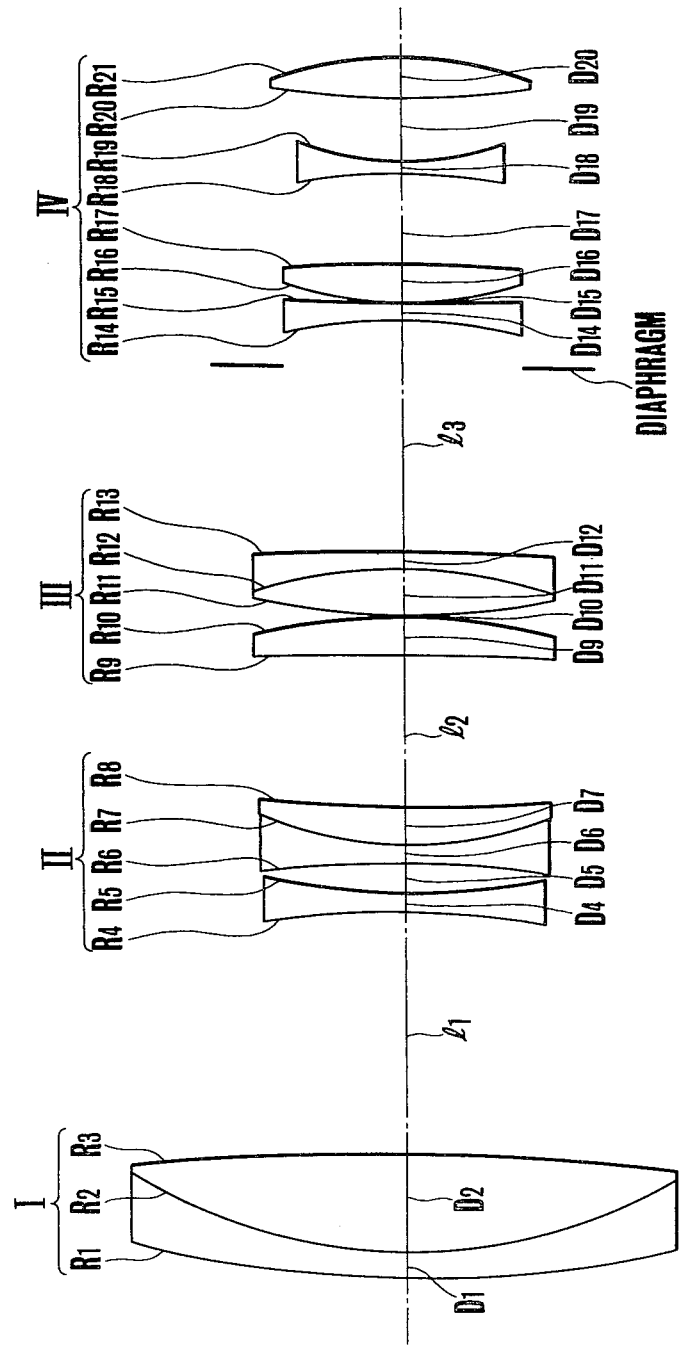
FIG. 7 is a lens block diagram of a third embodiment of the present invention.
Figure 8:
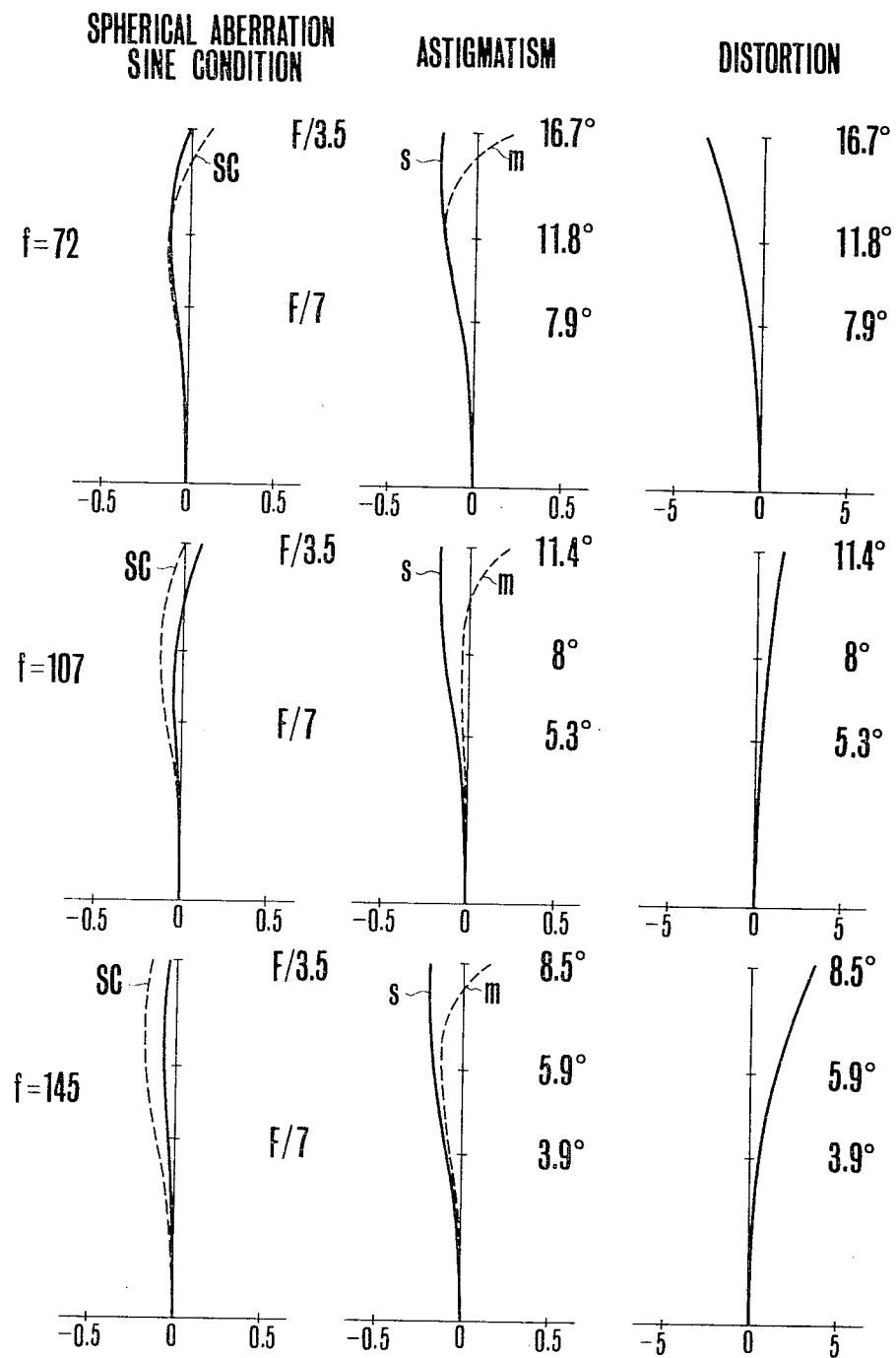
FIG. 8 is graphic representations of the aberrations of the lens of FIG. 7 with object at infinity.

The aforesaid objectives of FIGS. 1, 4 and 7 which is increased in the relative aperture to a somewhat large extent without involving any great increase in the bulk and size of the complete objective, while nevertheless preserving high grade imaging performance by limiting the shift of image plane within the depth of focus, which has a shortest focal length exceeding that of the standard objective lens for still cameras, and which is inexpensive are best achieved, according to a more specific aspect of the present invention, by adhering to the following design specifications for the focal lengths, f1, f2 and f3 of the first, second and third lens groups I, II and III respectively in terms of the longest focal length Ft of the entire system, and for the ratio of the total amount of movements S of the zoom control groups I and III to the corresponding magnification change M:

(1) $0.97 F_t < f_1 < 1.23 F_t$
(2) $0.31 F_t < |f_2| < 0.42 F_t$
(3) $0.38 F_t < f_3 < 0.51 F_t$
(4) $12 < S/M < 17$

When the upper limits of inequalities (1) to (4) are violated, as stated above, the relative aperture can be advantageously increased, but the bulk and size of the complete objective is increased to so large extent that the diameter of the front lens group becomes extremely large to allow for focusing adjustment down to shorter distances (in the case of forward movement). Conversely when the lower limits are violated, though being advantageous in minimizing the bulk and size of the objective, a desired increase in the relative aperture becomes impossible. Further, because of the excessive refractive power of each of the groups, the aberrational problem becomes complicated due to the production of higher order aberrations of which correction is difficult to achieve as the number of available lens elements is limited.

For assisting in the stabilization of the various aberrations not only throughout the zooming range but also throughout the focusing range within the aforesaid framework, it is preferred fo fulfill the following specifications:

(5) $1.8 < |R_3/R_1| < 9.1$
(6) $1.7 < (N_1 + N_2)/2 < 1.8$
(7) $1.1 < |R_4/R_5| < 3$
(8) $2.2/F_t < |1/R_{14}| < 3.3/F_t$
(9) $2.8/F_t < |1/R_{16}| < 4/F_t$

Conditions (5) and (6) are set forth to preserve the good state of correction of the aberrations with focusing down to shorter object distances by forward axial movement of the first lens group I. When the lower limit of condition (5) is violated, over-correction of spherical aberration results in the telephoto position with object near the possible close-up, and extreme under-correction of astigmatism results. When the upper limit is violated, the spherical aberration changes to extreme under-correction. As the first lens group is constituted from only one doublet, it is required to adjust the refractive power to a moderate value. When the lower limit of condition (6) is violated, the radius of curvature of the internal contact surface is caused to decrease with increase in the production of higher order aberrations which are difficult to compensate for. When the upper limit is violated, though the compensation for the aberrations becomes easy to perform, glasses for the refractive indices N1 and N2 are of very especial sorts at the present time, so that the doublet is expensive. In addition thereto, the spectral transmittance and other optical properties are not favorable for manufacture of such doublet.

Condition (7) is set forth to reduce the over-correction of spherical aberration ascribable to the second lens group II particularly when in the telephoto settings. When the upper limit is violated, the over-correction of spherical aberration becomes objectionable, while when the lower limit is violated, the spherical aberration is reduced but the barrel type distortion becomes extremely large in the wide angle positions.

Conditions (8) and (9) are set forth to compensate for the outward coma ascribable to the zoom portion over the entire zooming range. The surfaces R14 and R16 produce not only inward coma but also over- and under-corrected spherical aberrations which are balanced out to zero spherical aberration. When the lower limits are violated, the inward coma is not sufficiently large to balance out the outward coma. When the upper limits are violated, the refractive powers becomes very strong with the result that higher order aberrations are increased to a large extent.

Three examples of specific zoom lenses of the present invention shown in FIGS. 1, 4 and 7 can be constructed as represented by the numerical values given in the following tables for the radii, R1 to R21, the fixed axial separations, D1 to D20, between the successive surfaces with the variable axial spacings 11 to 13, the refractive indices N1 to N12 for the spectral d line of sodium for the various lens elements along with the Abbe numbers $\nu 1$ to $\nu 12$. The minus values of the radii, R, indicate surfaces concave toward the front. The numerical values for the parameters in the inequalities (1) to (9) are summerized in the last table.

EXAMPLE 1

Focal length f = 72-145.1 F/4.5
Angle of view 2ω = 33.4° to 17°

| | | | | | | | |
|---|---|---|---|---|---|---|---|
| R1 | 127.524 | D1 | 9 | N1 | 1.66672 | $\nu 1$ | 48.3 |
| R2 | −66.109 | D2 | 2.5 | N2 | 1.7552 | $\nu 2$ | 27.5 |
| R3 | −245.758 | l1 | Variable | | | | |
| R4 | −136.158 | D4 | 1.35 | N3 | 1.60311 | $\nu 3$ | 60.7 |
| R5 | 60.767 | D5 | 2.44 | | | | |
| R6 | −64.282 | D6 | 1.35 | N4 | 1.60311 | $\nu 4$ | 60.7 |
| R7 | 50.461 | D7 | 3.5 | N5 | 1.7552 | $\nu 5$ | 27.5 |
| R8 | −5835.54 | l2 | Variable | | | | |
| R9 | 226.548 | D9 | 3.47 | N6 | 1.60311 | $\nu 6$ | 60.7 |
| R10 | −68.358 | D10 | 0.15 | | | | |
| R11 | 62.124 | D11 | 1.4 | N7 | 1.7552 | $\nu 7$ | 27.5 |
| R12 | 29.935 | D12 | 4.4 | N8 | 1.60311 | $\nu 8$ | 60.7 |
| R13 | 338.354 | l3 | Variable | | | | |
| R14 | −48.874 | D14 | 1.2 | N9 | 1.53996 | $\nu 9$ | 59.5 |
| R15 | 23644.7 | D15 | 0.15 | | | | |
| R16 | 38.239 | D16 | 3.31 | N10 | 1.66755 | $\nu 10$ | 41.9 |
| R17 | 1218.25 | D17 | 5.74 | | | | |
| R18 | −134.584 | D18 | 1.1 | N11 | 1.6398 | $\nu 11$ | 34.5 |
| R19 | 35.217 | D19 | 6.61 | | | | |
| R20 | 239.927 | D20 | 3.23 | N12 | 1.6935 | $\nu 12$ | 53.2 |
| R21 | −48.356 | | | | | | |

Lens Separation during Zooming with Object at Infinity

| f | l1 | l2 | l3 |
|---|---|---|---|
| 72 | 5.012 | 29.575 | 5.4 |
| 108 | 20.568 | 14.019 | 20.956 |
| 145.1 | 31.598 | 2.989 | 31.986 |

EXAMPLE 2

Focal length f = 72-145.1 F/4.5
Angle of view 2ω = 33.4° to 17°

| | | | | | | | |
|---|---|---|---|---|---|---|---|
| R1 | 93.85 | D1 | 2.5 | N1 | 1.7552 | $\nu 1$ | 27.5 |
| R2 | 45.873 | D2 | 9.1 | N2 | 1.66672 | $\nu 2$ | 48.3 |
| R3 | −841.936 | l1 | Variable | | | | |
| R4 | −162.312 | D4 | 1.35 | N3 | 1.60311 | $\nu 3$ | 60.7 |
| R5 | 57.573 | D5 | 2.44 | | | | |
| R6 | −62.644 | D6 | 1.35 | N4 | 1.60311 | $\nu 4$ | 60.7 |
| R7 | 51.763 | D7 | 3.5 | N5 | 1.7552 | $\nu 5$ | 27.5 |
| R8 | −2739.5 | l2 | variable | | | | |
| R9 | 1057.55 | D9 | 3.47 | N6 | 1.60311 | $\nu 6$ | 60.7 |
| R10 | −56.3805 | D10 | 0.15 | | | | |
| R11 | 75.392 | D11 | 4.39 | N7 | 1.60311 | $\nu 7$ | 60.7 |
| R12 | −57 | D12 | 1.4 | N8 | 1.7552 | $\nu 8$ | 27.5 |
| R13 | −3578.3 | l3 | variable | | | | |
| R14 | −45.952 | D14 | 1.2 | N9 | 1.53996 | $\nu 9$ | 59.5 |
| R15 | 1540.6 | D15 | 0.15 | | | | |
| R16 | 37.454 | D16 | 3.31 | N10 | 1.66755 | $\nu 10$ | 41.9 |
| R17 | −297.024 | D17 | 5.74 | | | | |
| R18 | −109.144 | D18 | 1.1 | N11 | 1.6398 | $\nu 11$ | 34.5 |
| R19 | 33.671 | D19 | 6.61 | | | | |
| R20 | 239.68 | D20 | 3.23 | N12 | 1.6935 | $\nu 12$ | 53.2 |
| R21 | −46.332 | | | | | | |

Lens Separation during Zooming with Object at Infinity

| f | l1 | l2 | l3 |
|---|---|---|---|
| 72 | 3.383 | 29.114 | 5.4 |
| 108 | 18.938 | 13.559 | 20.955 |
| 145.1 | 29.968 | 2.529 | 31.985 |

EXAMPLE 3

Focal length f = 72-145 F/3.5
Angle of view 2ω = 33.4° to 17°

| | | | | | | | |
|---|---|---|---|---|---|---|---|
| R1 | 148.243 | D1 | 2.7 | N1 | 1.7552 | $\nu 1$ | 27.5 |
| R2 | 63.55 | D2 | 10.5 | N2 | 1.66672 | $\nu 2$ | 48.3 |
| R3 | −328.059 | l1 | variable | | | | |
| R4 | −116.516 | D4 | 2. | N3 | 1.60311 | $\nu 3$ | 60.7 |
| R5 | 88.058 | D5 | 3.2 | | | | |
| R6 | −134.676 | D6 | 2. | N4 | 1.60311 | $\nu 4$ | 60.7 |
| R7 | 46.494 | D7 | 4. | N5 | 1.7552 | $\nu 5$ | 27.5 |
| R8 | 203.229 | l2 | variable | | | | |
| R9 | −586.221 | D9 | 4. | N6 | 1.60311 | $\nu 6$ | 60.7 |
| R10 | −74.988 | D10 | 0.15 | | | | |
| R11 | 77.079 | D11 | 5. | N7 | 1.60311 | $\nu 7$ | 60.7 |
| R12 | −57.304 | D12 | 1.8 | N8 | 1.7552 | $\nu 8$ | 27.5 |
| R13 | −405.975 | l3 | variable | | | | |
| R14 | −61.151 | D14 | 1.8 | N9 | 1.53996 | $\nu 9$ | 59.5 |
| R15 | 349.769 | D15 | 0.15 | | | | |
| R16 | 49.582 | D16 | 4. | N10 | 1.66755 | $\nu 10$ | 41.9 |
| R17 | −181.288 | D17 | 9.98 | | | | |
| R18 | −71.788 | D18 | 1.5 | N11 | 1.6398 | $\nu 11$ | 34.5 |
| R19 | 39.074 | D19 | 7. | | | | |
| R20 | 114.002 | D20 | 4. | N12 | 1.6968 | $\nu 12$ | 55.5 |
| R21 | −47.524 | | | | | | |

Lens Separation during Zooming with Object at Infinity

| f | l1 | l2 | l3 |
|---|---|---|---|
| 72 | 7.664 | 34.522 | 6.6 |
| 107 | 25.864 | 16.322 | 24.8 |
| 145 | 39.514 | 2.672 | 38.45 |

| | Example 1 | Example 2 | Example 3 |
|---|---|---|---|
| f1 | 1 . Ft | 1 . Ft | 1.214Ft |
| f2 | −0.331Ft | −0.331Ft | −0.398Ft |
| f3 | 0.408Ft | 0.408Ft | 0.489Ft |
| S/M | 13.19 | 13.19 | 15.82 |
| R3/R1 | −1.927 | −8.971 | −2.213 |

-continued

|  | Example 1 | Example 2 | Example 3 |
|---|---|---|---|
| (N1 + N2)/2 | 1.71096 | 1.71096 | 1.71096 |
| R4/R5 | −2.241 | −2.819 | −1.323 |
| 1/R14 | −2.968/Ft | −3.155/Ft | −2.371/Ft |
| 1/R16 | 3.792/Ft | 3.871/Ft | 2.924/Ft |
| 1/4S | 0.0306F | 0.0306F | 0.032F |
| 3/4S | −0.0351F | −0.0351F | −0.0367F |
| S | 0.01F | 0.01F | 0.01F |

What is claimed is:

1. An optically compensated zoom lens comprising, from the object side, a first lens group having a positive refractive power and consisting of only a cemented bi-convex lens having a divergent contact surface;

a second lens group having a negative refractive power and consisting of a negative lens and a cemented negative lens having a convergent contact surface convex toward the front;

a third lens group having a positive refractive power and consisting of a positive lens and a cemented positive lens having a second divergent contact surface, said second divergent contact surface being of curvature of the opposite sign to that of the curvature of the first divergent contact surface of said first lens group; and a relay lens group including a plurality of lenses with the frontmost surface concave toward the front, whereby, when zooming, said first and said third lens groups are axially moved in fixedly spaced relation to each other on the opposite side of said second lens group and said second lens group is fixed.

2. A zoom lens according to claim 1, wherein said relay lens consists of a negative lens, a bi-convex lens, a bi-concave lens and a bi-convex lens in this order from the front.

3. A zoom lens according to claim 1, wherein said first, said second and said third lens groups fulfill the following conditions:

$f = 1.Ft$ $f2 = -0.331.Ft$ $f3 = 0.408.Ft$ $S/M = 13.19$ wherein f1, f2 and f3 are the focal lengths of the first, second and third lens groups respectively; Ft is the focal length of the entire system when in the telephoto setting; S is the total length of movement of the first and third lens groups with the zooming from the wide angle to the telephoto position; and M is the magnification ratio.

4. A zoom lens according to claim 3, wherein said lens fulfills the following conditions:

$R3/R1 = -1.927$ $(N1+N2)/2 = 1.71096$ $R4/R5 = -2.241$ $1/R14 = -2.968/Ft$ $1/R16 = 3.792/Ft$ where R1 and R3 are the radii of curvature of the first and third surfaces counting from the front in said first lens group; R4 and R5 are the radii of curvature of the first and second surfaces counting from the front in the said second lens group; R14 and R16 are the radii of curvature of the first and second surfaces counting from the front in said relay lens group; Ft is the focal length of the entire system when in the telephoto setting; and N1 and N2 are the refractive indices of the first and second lens elements counting from the front in the first lens group.

5. A zoom lens according to claim 1, wherein said first, said second and said third lens groups fulfill the following conditions:

$f1 = 1.Ft$ $f2 = -0.331Ft$ $f3 = 0.408.Ft$ $S/M = 13.19$ wherein f1, f2 and f3 are the focal lengths of the first, second and third lens groups respectively; Ft is the focal length of the entire system in the telephoto setting; S is the total length of movement of the first and third lens groups with the zooming from the wide angle to the telephoto position; and M is the magnification ratio.

6. A zoom lens according to claim 5, wherein said lens fulfills the following conditions:

$R3/R1 = -8.971$ $(N1+N2)/2 = 1.71096$ $R4/R5 = -2.819$ $1/R14 = -3.155/Ft$ $1/R16 = 3.871/Ft$ where R1 and R3 are the radii of curvature of the first and third surfaces counting from the front in said first lens group; R4 and R5 are the radii of curvature of the first and second surfaces counting from the front in the said second lens group; R14 and R16 are the radii of curvature of the first and second surfaces counting from the front in said relay lens group; Ft is the focal length of the entire system when in the telephoto setting; and N1 and N2 are the refractive indices of the first and second lens elements counting from the front in the first lens group.

7. A zoom lens according to claim 1, wherein said first, said second and said third lens groups fulfill the following conditions:

$f1 = 1.214Ft$ $f2 = -0.398Ft$ $f3 = 0.489Ft$ $S/M = 15.82$ wherein f1, f2 and f3 are the focal lengths of the first, second and third lens groups respectively; Ft is the focal length of the entire system when in the telephoto setting; S is the total length of movement of the first and third lens groups with the zooming from the wide angle to the telephoto position; and M is the magnification ratio.

8. A zoom lens according to claim 7, wherein said lens fulfills the following conditions:

$$R3/R1 = -2.213$$

$$(N1+N2)/2 = 1.71096$$

$$R4/R5 = -1.323$$

$$1/R14 = -2.371/Ft$$

$$1/R16 = 2.924/Ft$$

where R1 and R3 are the radii of curvature of the first and third surfaces counting from the front in said first lens group; R4 and R5 are the radii of curvature of the first and second surfaces counting from the front in the said second lens group; R14 and R16 are the radii of curvature of the first and second surfaces counting from the front in said relay lens group; Ft is the focal length of the entire system when in the telephoto setting; and N1 and N2 are the refractive indices of the first and second lens elements counting from the front in the first lens group.

9. An optically compensated zoom lens substantially according to the following specification:

| | | | | | | | | |
|---|---|---|---|---|---|---|---|---|
| R1 | 127.524 | D1 | 9 | | N1 | 1.66672 | $v1$ | 48.3 |
| R2 | −66.109 | D2 | 2.5 | | N2 | 1.7552 | $v2$ | 27.5 |
| R3 | −245.758 | l1 | variable | | | | | |
| R4 | −136.158 | D4 | 1.35 | N3 | | 1.60311 | $v3$ | 60.7 |
| R5 | 60.767 | D5 | 2.44 | | | | | |
| R6 | −64.282 | D6 | 1.35 | N4 | | 1.60311 | $v4$ | 60.7 |
| R7 | 50.461 | D7 | 3.5 | N5 | | 1.7552 | $v5$ | 27.5 |
| R8 | −5835.54 | l2 | variable | | | | | |
| R9 | 226.548 | D9 | 3.47 | N6 | | 1.60311 | $v6$ | 60.7 |
| R10 | −68.358 | D10 | 0.15 | | | | | |
| R11 | 62.124 | D11 | 1.4 | N7 | | 1.7552 | $v7$ | 27.5 |
| R12 | 29.935 | D12 | 4.4 | N8 | | 1.60311 | $v8$ | 60.7 |
| R13 | 338.354 | l3 | variable | | | | | |
| R14 | −48.874 | D14 | 1.2 | N9 | | 1.53996 | $v9$ | 59.5 |
| R15 | 23644.7 | D15 | 0.15 | | | | | |
| R16 | 38.239 | D16 | 3.31 | N10 | | 1.66755 | $v10$ | 41.9 |
| R17 | −1218.25 | D17 | 5.74 | | | | | |
| R18 | −134.584 | D18 | 1.1 | N11 | | 1.6398 | $v11$ | 34.5 |
| R19 | 35.217 | D19 | 6.61 | | | | | |
| R20 | 239.927 | D20 | 3.23 | N12 | | 1.6935 | $v12$ | 53.2 |
| R21 | −48.356 | | | | | | | | wherein the radii of the curvature R are numbered in order from front to rear, the fixed axial separations, D1 to D20, between the successive surfaces with the variable axial spacings l1 to l3, the refractive indices N1 to N12 for the spectral d line of sodium for the various lens elements along with the Abbe numbers $v1$ to $v12$.

10. An optically compensated zoom lens substantially according to the following specification:

| | | | | | | | | |
|---|---|---|---|---|---|---|---|---|
| R1 | 93.85 | D1 | 2.5 | N1 | | 1.7552 | $v1$ | 27.5 |
| R2 | 45.873 | D2 | 9.1 | N2 | | 1.66672 | $v2$ | 48.3 |
| R3 | −841.936 | l1 | variable | | | | | |
| R4 | −162.312 | D4 | 1.35 | N3 | | 1.60311 | $v3$ | 60.7 |
| R5 | 57.573 | D5 | 2.44 | | | | | |
| R6 | −62.644 | D6 | 1.35 | N4 | | 1.60311 | $v4$ | 60.7 |
| R7 | 51.763 | D7 | 3.5 | N5 | | 1.7552 | $v5$ | 27.5 |
| R8 | −2739.5 | l2 | variable | | | | | |
| R9 | 1057.55 | D9 | 3.47 | N6 | | 1.60311 | $v6$ | 60.7 |
| R10 | −56.3805 | D10 | 0.15 | | | | | |
| R11 | 75.392 | D11 | 4.39 | N7 | | 1.60311 | $v7$ | 60.7 |
| R12 | −57 | D12 | 1.4 | N8 | | 1.7552 | $v8$ | 27.5 |
| R13 | −3578.3 | l3 | variable | | | | | |
| R14 | −45.952 | D14 | 1.2 | N9 | | 1.53996 | $v9$ | 59.5 |
| R15 | 1540.6 | D15 | 0.15 | | | | | |
| R16 | 37.454 | D16 | 3.31 | N10 | | 1.66755 | $v10$ | 41.9 |
| R17 | −297.024 | D17 | 5.74 | | | | | |
| R18 | −109.144 | D18 | 1.1 | N11 | | 1.6398 | $v11$ | 34.5 |
| R19 | 33.671 | D19 | 6.61 | | | | | |
| R20 | 239.68 | D20 | 3.23 | N12 | | 1.6935 | $v12$ | 53.2 |
| R21 | −46.332 | | | | | | | | wherein the radii of the curvature R are numbered in order from front to rear, the fixed axial separations, D1 to D20, between the successive surfaces with the variable axial spacings l1 to l3, the refractive indices N1 to N12 for the spectral d line of sodium for the various lens elements along with the Abbe numbers $v1$ to $v12$.

11. An optically compensated zoom lens substantially according to the following specification:

| | | | | | | | | |
|---|---|---|---|---|---|---|---|---|
| R1 | 148.243 | D1 | 2.7 | N1 | | 1.7552 | $v1$ | 27.5 |
| R2 | 63.55 | D2 | 10.5 | N2 | | 1.66672 | $v2$ | 48.3 |
| R3 | −328.059 | l1 | variable | | | | | |
| R4 | −116.516 | D4 | 2. | N3 | | 1.60311 | $v3$ | 60.7 |
| R5 | 88.058 | D5 | 3.2 | | | | | |
| R6 | −134.676 | D6 | 2. | N4 | | 1.60311 | $v4$ | 60.7 |
| R7 | 46.494 | D7 | 4. | N5 | | 1.7552 | $v5$ | 27.5 |
| R8 | 203.229 | l2 | variable | | | | | |
| R9 | −586.221 | D9 | 4. | N6 | | 1.60311 | $v6$ | 60.7 |
| R10 | −74.988 | D10 | 0.15 | | | | | |
| R11 | 77.079 | D11 | 5. | N7 | | 1.60311 | $v7$ | 60.7 |
| R12 | −57.304 | D12 | 1.8 | N8 | | 1.7552 | $v8$ | 27.5 |
| R13 | −405.975 | l3 | variable | | | | | |
| R14 | −61.151 | D14 | 1.8 | N9 | | 1.53996 | $v9$ | 59.5 |
| R15 | 349.769 | D15 | 0.15 | | | | | |
| R16 | 49.582 | D16 | 4. | N10 | | 1.66755 | $v10$ | 41.9 |
| R17 | −181.288 | D17 | 9.98 | | | | | |
| R18 | −71.788 | D18 | 1.5 | N11 | | 1.6398 | $v11$ | 34.5 |
| R19 | 39.074 | D19 | 7. | | | | | |
| R20 | 114.002 | D20 | 4. | N12 | | 1.6968 | $v12$ | 55.5 |
| R21 | −47.524 | | | | | | | | wherein the radii of the curvature R are numbered in order from front to rear, the fixed axial separations, D1 to D20, between the successive surfaces with the variable axial spacings l1 to l3, the refractive indices N1 to N12 for the spectral d line of sodium for the various lens elements along with the Abbe numbers $v1$ to $v12$.

* * * * *